(12) United States Patent
Nukui

(10) Patent No.: US 8,937,979 B2
(45) Date of Patent: Jan. 20, 2015

(54) GAS LASER OSCILLATOR HAVING FUNCTION TO DETERMINE INITIATION OF ELECTRIC DISCHARGE

(71) Applicant: Fanuc Corporation, Yamanashi (JP)

(72) Inventor: Tooru Nukui, Yamanashi (JP)

(73) Assignee: Fanuc Corporation, Minamitsuru-Gun (JP)

( * ) Notice: Subject to any disclaimer, the term of this patent is extended or adjusted under 35 U.S.C. 154(b) by 0 days.

(21) Appl. No.: 14/246,642

(22) Filed: Apr. 7, 2014

(65) Prior Publication Data

US 2014/0307754 A1    Oct. 16, 2014

(30) Foreign Application Priority Data

Apr. 12, 2013   (JP) .................................. 2013-084047

(51) Int. Cl.
*H01S 3/00*       (2006.01)
*H01S 3/097*      (2006.01)

(52) U.S. Cl.
CPC ................................ *H01S 3/09702* (2013.01)
USPC ...................................................... 372/38.02

(58) Field of Classification Search
CPC ...... H01S 3/09702; H01S 3/00; H01S 3/0903
USPC ...................................... 219/69, 69.13; 372/2
See application file for complete search history.

(56) References Cited

U.S. PATENT DOCUMENTS 5,187,341 A * 2/1993 Graell .......................... 219/69.13

FOREIGN PATENT DOCUMENTS

JP       2011-222586    * 11/2011     .............. H01S 3/097

* cited by examiner

*Primary Examiner* — Colleen A Matthews
*Assistant Examiner* — Tuan Nguyen
(74) *Attorney, Agent, or Firm* — RatnerPrestia

(57) ABSTRACT

A gas laser oscillator includes a control apparatus which creates a command voltage, a laser power supply which supplies power to a discharge tube in accordance with the command voltage, and a voltage detecting unit which detects a voltage applied to the discharge tube. The control apparatus includes a determining unit which determines whether or not a discharge is initiated in the discharge tube, based on a rate of changes in the voltage detected by the voltage detecting unit when power is supplied to the discharge tube in accordance with the command voltage being increased in a stepwise manner. The determining unit is configured to determine whether or not a discharge is initiated in the discharge tube after an initial step that at least includes the first incremental step of the command voltage being increased in a stepwise manner.

1 Claim, 5 Drawing Sheets

GAS LASER OSCILLATOR HAVING FUNCTION TO DETERMINE INITIATION OF ELECTRIC DISCHARGE

BACKGROUND ART

1. Technical Field

The present invention relates to a gas laser oscillator having a function to determine the initiation of an electric discharge.

2. Description of the Related Art

In a gas laser oscillator, high-frequency power is applied to a discharge tube to excite a laser gas contained in the discharge tube. If a high voltage is applied to the discharge tube when an electric discharge is not yet initiated, an impedance mismatch may occur between the laser power supply and the discharge tube, as a result of which an excessively large current may flow in the laser power supply and an excessively large voltage may be applied to the discharge tube. If this happens, the laser power supply or the discharge tube may be damaged, or to prevent such damage, the gas laser oscillator is forcefully turned off.

A gas laser oscillator is known, which is provided with an auxiliary electrode for producing an auxiliary electric discharge separately from a main electric discharge for generating a laser. This is intended to reduce a temporary voltage increase at the time of initiating the electric discharge by producing an auxiliary electric discharge prior to the main electric discharge for providing laser output.

JP-A-2011-222586 discloses a gas laser oscillator including a determining unit for determining initiation of an electric discharge. The determining unit is configured to determine initiation of an electric discharge by comparing a rate of changes in the voltage of the discharge tube in response to an output command from the power supply with data collected when an electric discharge is normally produced in the discharge tube.

The method disclosed in JP-A-2011-222586 includes providing a command voltage increasing in a stepwise manner, and monitoring the voltage of the discharge tube in response to the command voltage, in order to determine whether an electric discharge is initiated or not. However, in the case of an auxiliary electric discharge with a minuscule output level, it has been difficult to determine initiation of the auxiliary electric discharge, since changes in the voltage of the discharge tube are very small.

FIG. 5 is a graph depicting the relationship between the command voltage CV' supplied to a laser power supply unit and the voltage V' applied to the discharge tube. "CV'1" indicates the value of the command voltage CV' when the auxiliary electric discharge is initiated, and "CV'2" indicates the value of the command voltage CV' when the main electric discharge is initiated. As can be seen from the graph of FIG. 5, the rate of changes in the applied voltage V' with respect to the command voltage CV' changes significantly before and after the main electric discharge is initiated. Accordingly, it is possible to determine the initiation of the main electric discharge by continuously monitoring the rate of changes in the applied voltage V'. On the other hand, the rate of changes in the applied voltage V' does not substantially change before and after the auxiliary electric discharge is initiated. Therefore, it is difficult to accurately determine the time at which the auxiliary electric discharge is initiated.

As can be seen from FIG. 5, the auxiliary electric discharge is initiated at the command voltage CV'1 which is smaller than the command voltage CV'2 required to initiate the main electric discharge. Therefore, instead of determining at the time at which the auxiliary electric discharge is initiated, it is possible to at least determine whether or not the auxiliary electric discharge has already been initiated, by determining the initiation of the main electric discharge.

For example, in the related art disclosed in JP-A-2011-222586, the command voltage to the power supply unit needs to be switched so that the command voltage increases in a stepwise manner, in order to determine the initiation of the main electric discharge. However, a voltage value of the discharge tube cannot be detected stably immediately after the switching of the command voltage, due to a time delay associated with a time constant of the monitoring circuit or with the timing of A/D conversion, or depending on the relationship with a control cycle of CNC (computer numerical control) equipment. As a result, a waiting time of sufficient length, for example, at least 200 ms, has to be provided. If the process for determining the discharge initiation is performed before the waiting time elapses, the determination of the discharge initiation may be incorrect, since the voltage being applied to the discharge tube cannot be monitored accurately.

FIG. 6 is a graph for explaining a method for determining the initiation of an electric discharge in the gas laser oscillator according to the above related art. In the graph of FIG. 6, a solid line indicates the command voltage CV' supplied to the power supply unit, and each square represents the voltage applied to the discharge tube detected in a predetermined sampling cycle. The command voltage CV' is controlled in accordance with a ramp command so that the command voltage CV' gradually increases over the period from time t1 to time t2 (for example, over a period of several hundred milliseconds) until it reaches V'1. At time t2, the command voltage CV' is switched to a step command to start the discharge initiation determining process, but there is a waiting time from time t2 to time t3, in order to avoid the effects of the above-mentioned time delay or the like. The length of the waiting time varies, depending on the hardware configuration, but is generally not shorter than 200 ms, and this waiting time has been a factor causing a delay in the discharge initiation determining process. In FIG. 6, a white square indicates a sampled value taken when the applied voltage V' cannot be detected stably, i.e., a sampled value taken during the waiting time.

Therefore, there is a need for a gas laser oscillator including a determining unit that can reliably determine initiation of an electric discharge in a short period of time.

SUMMARY OF THE INVENTION

According to one aspect of the present invention, a gas laser oscillator comprising: a control apparatus which creates a command voltage; a laser power supply which supplies power to a discharge tube in accordance with the command voltage; and a voltage detecting unit which detects a voltage applied to said discharge tube, wherein said control apparatus includes a determining unit which determines whether or not an electric discharge is initiated in said discharge tube, based on a rate of changes in the voltage detected by said voltage detecting unit when power is supplied to said discharge tube in accordance with the command voltage being increased in a stepwise manner, and wherein said determining unit is configured to determine whether or not an electric discharge is initiated in said discharge tube after an initial step that at least includes the first incremental step of the command voltage being increased in a stepwise manner, is provided.

These and other objects, features and advantages of the present invention will become more apparent from the detailed description of exemplary embodiments with reference to the accompanying drawings.

DETAILED DESCRIPTION OF THE INVENTION

An embodiment of the present invention will be described below with reference to the accompanying drawings. Constituent elements of the illustrated embodiment may be modified in size in relation to one another for better understanding of the present invention.

Figure 1:
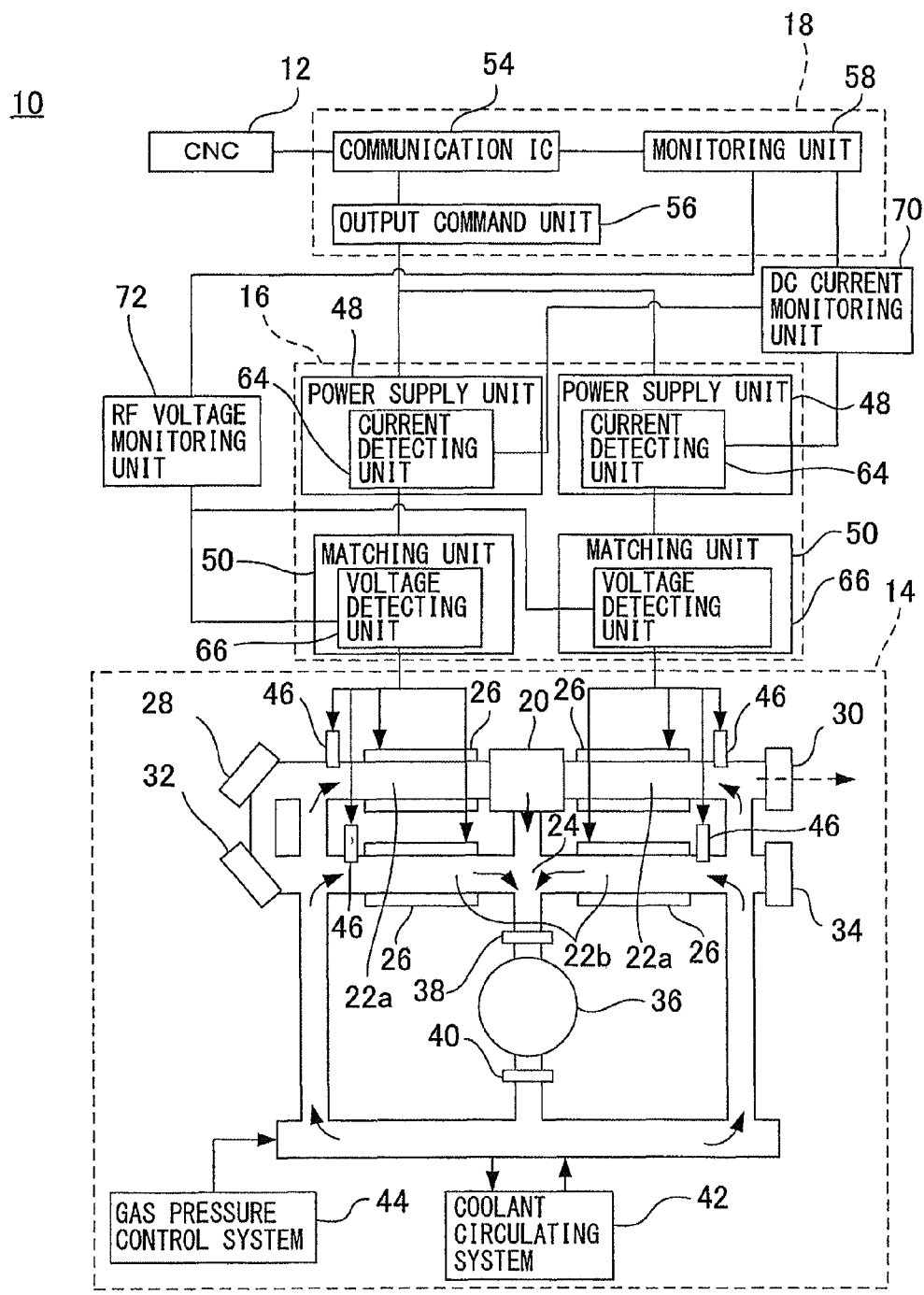
FIG. 1 is a diagram schematically showing the overall configuration of a gas laser oscillator according to one embodiment of the present invention.

FIG. 1 is a diagram schematically showing the overall configuration of a gas laser oscillator 10 according to one embodiment of the present invention. The gas laser oscillator 10 includes a CNC (computer numerical control) apparatus 12 which controls the operation of the gas laser oscillator 10, a gas circulating system 14 which circulates a gas as a laser medium, a power application unit 16 which applies power to electrodes (main electrodes 26 and auxiliary electrodes 46) provided on discharge tubes 22a and 22b which constitute part of the gas circulating system 14, and an interface unit 18 interposed between the CNC apparatus 12 and the power application unit 16.

The gas circulating system 14 includes a first pair of discharge tubes 22a connected to each other via a connecting holder 20, and a second pair of discharge tubes 22b connected to each other via a junction 24 and connected in parallel to the discharge tubes 22a. The first pair of discharge tubes 22a are provided, at their ends opposite to the connecting holder 20, with a first reflecting mirror 28 which is a totally reflecting mirror, and with an output mirror 30 which is a partially reflecting mirror, respectively. The second pair of discharge tubes 22b are provided, at their ends opposite to the junction 24, with a second reflecting mirror 32 which is a totally reflecting mirror, and with a rear mirror 34 which is a partially reflecting mirror. The configuration of an optical resonator for amplifying laser light is not limited to the illustrated example.

The gas circulating system 14 is filled with a laser gas as a laser medium that has the property of emitting light when excited. The gas circulating system 14 incorporates a turbo blower 36. The turbo blower 36 is connected on its suction side to one end of each of the discharge tubes 22a and 22b via the connecting holder 20 or the junction 24, and on its discharge side to the other end of each of the discharge tubes 22a and 22b. The turbo blower 36 causes the laser gas to circulate through the gas circulating system 14 as indicated by arrows in the figure. Heat exchangers 38 and 40 for cooling the laser gas are provided on the suction side and the discharge side of the turbo blower 36, respectively. A coolant circulating system 42 for supplying a coolant is connected to the heat exchangers 38 and 40. Further, a gas pressure control system 44 for controlling the pressure of the laser gas is connected to the gas circulating system 14.

A pair of main electrodes 26 is provided on the outer surface of each of the discharge tubes 22a and 22b in such a manner as to oppose each other. The main electrodes 26 of each of the discharge tubes 22a and 22b are connected to the power application unit 16. Further, each of the discharge tubes 22a and 22b is provided with an auxiliary electrode 46 at a position axially distant from the pair of main electrodes 26. High-frequency power is supplied to the main electrodes 26 and auxiliary electrodes 46 from power supply units 48 via matching units 50, thereby producing electric discharges in the discharge tubes 22a and 22b.

The CNC apparatus 12 has a hardware configuration including a CPU, RAM, ROM, etc. (not shown), and is designed to perform various computational operations and output a control command for controlling the gas laser oscillator 10 in accordance with a predetermined operation program. In particular, in connection with the present invention, the CNC apparatus 12 includes a determining unit 52 (see FIG. 2) which determines whether or not an electric discharge is initiated in each of the discharge tubes 22a and 22b. A communication IC (integrated circuit) 54 has the function of transferring signals between the CNC apparatus 12 and other functional units. In the illustrated example, an output command unit 56 and a monitoring unit 58 are connected to the communication IC 54. In response to the control command supplied from the CNC apparatus 12 via the communication IC 54, the output command unit 56 outputs a command voltage signal to the power supply units 48 in the power application unit 16. The monitoring unit 58 in the interface unit 18 has the function of monitoring currents and voltages detected by various detectors (to be described later) incorporated in the power application unit 16.

Figure 2:
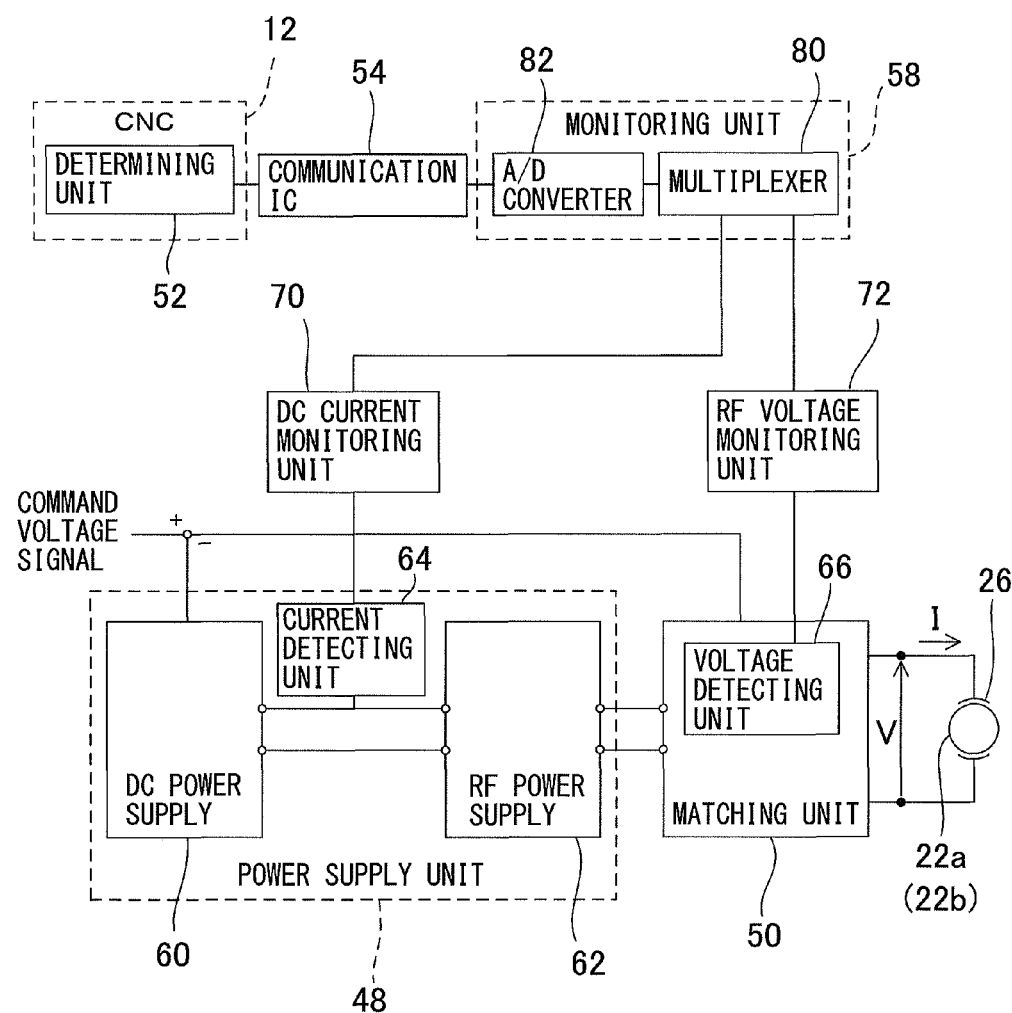
FIG. 2 is a detailed diagram showing in further detail the configuration of a portion of the gas laser oscillator of FIG. 1.

FIG. 2 is a detailed diagram showing in further detail the configuration of a portion of the gas laser oscillator 10 of FIG. 1. As shown, each power supply unit 48 in the power application unit 16 includes a DC power supply 60, an RF power supply 62, and a current detecting unit 64. The DC power supply 60 outputs a direct current, based on the command voltage signal from the output command unit 56 and the current feedback corresponding to the current I flowing through the discharge tube 22a or 22b and fed back from the matching unit 50. The direct current from the DC power supply 60 is converted by the RF power unit 62 into high-frequency AC power.

The high-frequency power from the RF power supply 62 is supplied to the matching unit 50. The matching unit 50 applies a voltage to the discharge tube 22a and 22b in response to the command voltage signal received from the output command unit 56. The matching unit 50 includes a voltage detecting unit 66 for detecting the voltage applied to the discharge tube 22a and 22b. The current signal detected by the current detecting unit 64 in the power supply unit 48 is supplied via a DC current monitoring unit 70 to the monitoring unit 58. Further, the voltage signal detected by the voltage detecting unit 66 in the matching unit 50 is supplied via an RF voltage monitoring unit 72 to the monitoring unit 58.

The signal representing the direct current output from the DC power supply 60 via the DC current monitoring unit 70, and the signal representing the voltage V applied to the discharge tube 22a and 22b output from the RF voltage monitoring unit 72 are supplied to a multiplexer 80 in the monitoring unit 58. An output signal from the multiplexer 80 is converted from analog to digital by an A/D converter 82 and input to the communication IC 54.

Figure 5:
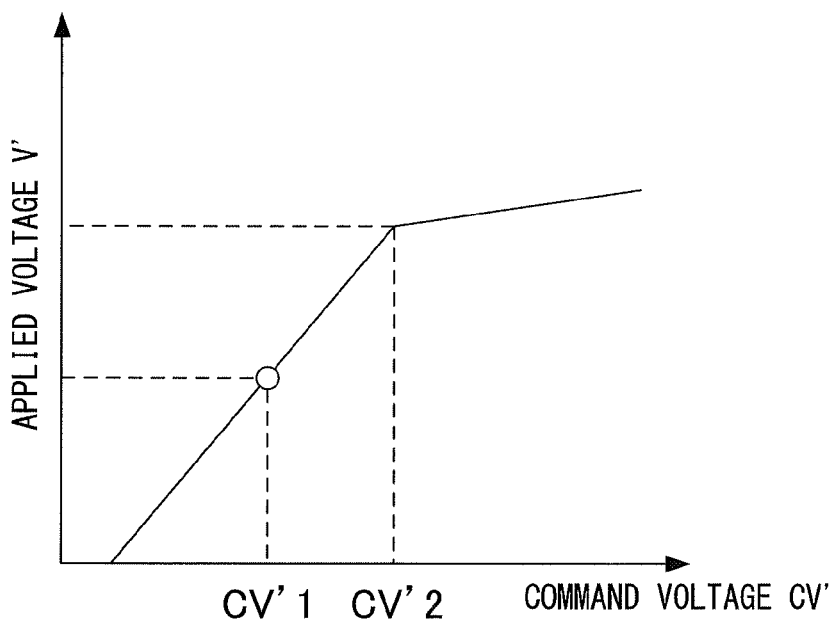
FIG. 5 is a graph depicting the relationship between a command voltage supplied to a laser power supply and a voltage applied to a discharge tube.
Figure 6:
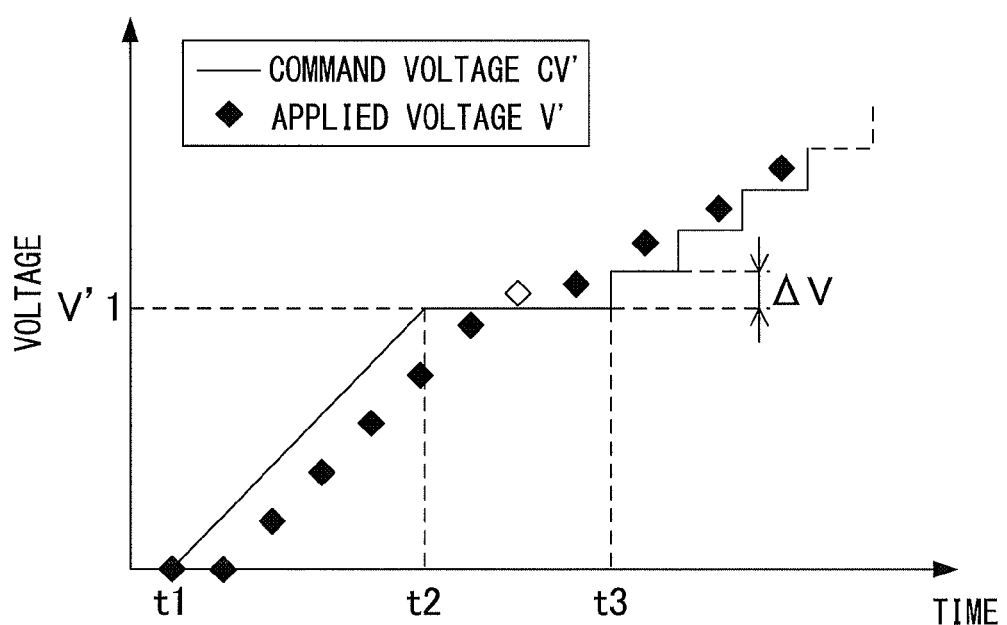
FIG. 6 is a graph to explain a discharge initiation determining method in a gas laser oscillator according to the related art.

The determining unit 52 of the CNC apparatus 12 has the function of determining whether a discharge is initiated in the discharge tubes 22a and 22b. When the determining unit 52 is activated, the rate of changes in the voltage V applied to the discharge tubes 22a and 22b, with respect to the command voltage supplied via the output command unit 56, is compared with a predetermined threshold value. As described above with reference to FIG. 5, once the main electric discharge is initiated, the rate of changes in the applied voltage with respect to the command voltage becomes significantly small. Accordingly, when the rate of changes in the voltage V becomes smaller than the predetermined threshold value, it can be determined that the main electric discharge is initiated. The determining unit 52 may perform, for example, the same processing as that described in JP-A-2011-222586 to determine the discharge initiation.

Figure 3:
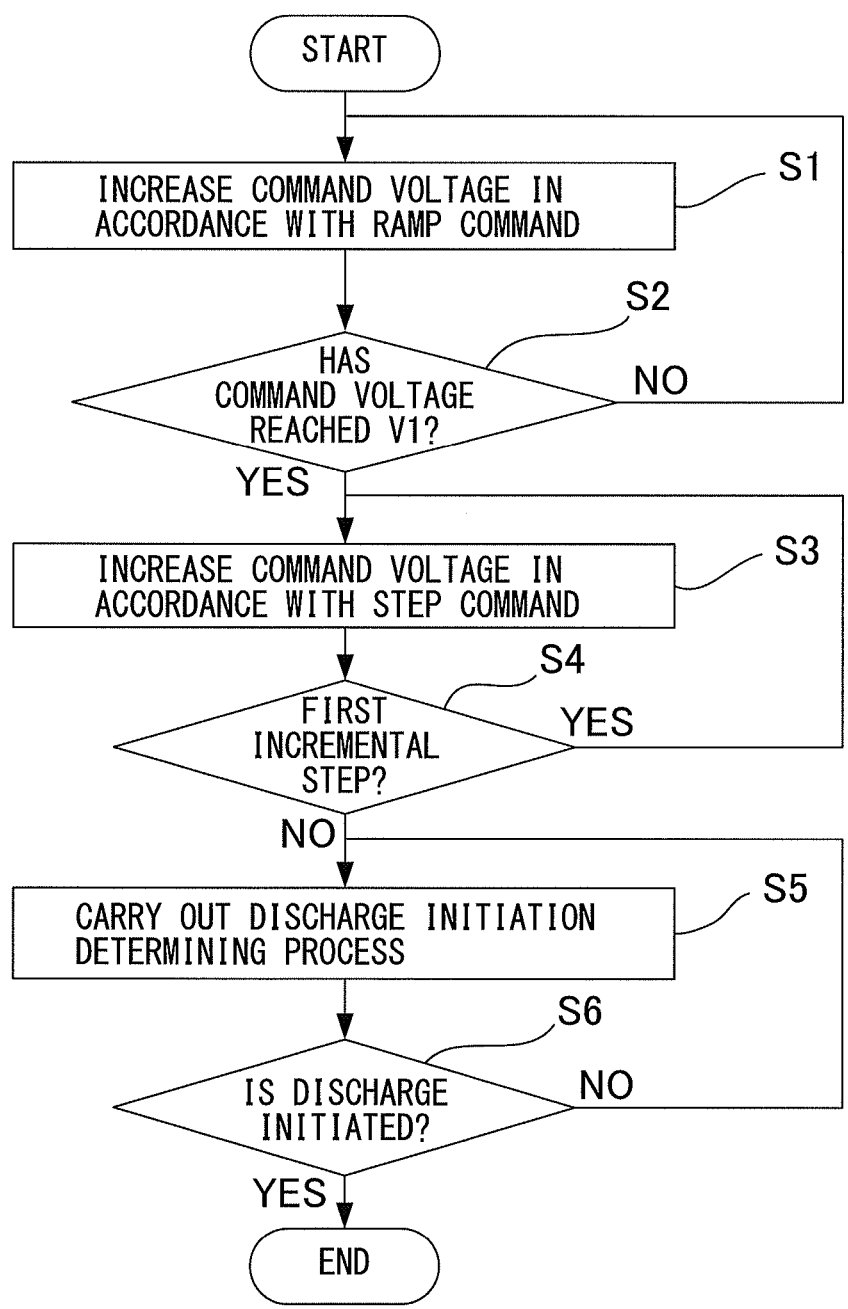
FIG. 3 is a flowchart illustrating a process of a discharge initiation determining method according to the present invention.
Figure 4:
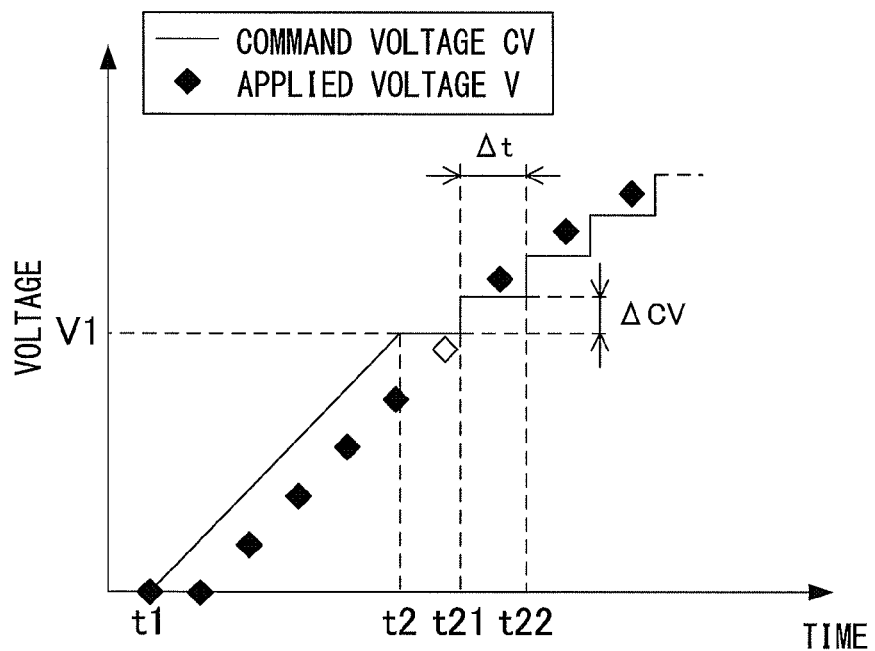
FIG. 4 is a graph to explain the discharge initiation determining method for the gas laser oscillator according to the embodiment of the present invention.

Next, a discharge initiation determining method according to one embodiment of the present invention will be described with reference to FIGS. 3 and 4. FIG. 3 is a flowchart illustrating a process implementing the discharge initiation determining method. FIG. 4 is a graph to explain the method of determining the discharge initiation in the gas laser oscillator according to the embodiment of the present invention.

While the discharge initiation determining process is in progress, the command voltage CV applied to the discharge tubes 22a and 22b by the power application unit 16 is monitored along with the voltage V applied to the discharge tube 22a and 22b in a predetermined sampling cycle, which depends on the hardware configuration. In FIG. 4, the solid line indicates the command voltage CV, and black and white squares represent the applied voltage V detected, respectively.

First, at step S1, a ramp command is created by the CNC apparatus 12, and the command voltage CV is controlled in accordance with the ramp command so that the command voltage CV increases, for example, at a constant rate (during the period from time t1 to time t2), though not limited to such an example. The process for increasing the command voltage CV at step S1 continues until the command voltage CV reaches a predetermined voltage V1. More specifically, it is determined at step S2 whether or not the command voltage CV has reached the voltage V1. If it is determined that the command voltage CV has not yet reached the voltage V1, the process returns to step S1 to continue to increase the command voltage CV. The voltage V1 is set greater than the voltage CV'1 at which the auxiliary electric discharge is initiated (see FIG. 5), but smaller than the voltage CV'2 at which the main electric discharge is initiated. The values of CV'1 and CV'2 are setting values obtained, for example, empirically through experimentation.

If it is determined at step S2 that the command voltage CV has reached the voltage V1, the process proceeds to step S3 to switch the command voltage CV. At step S3, the voltage command CV is switched to a step command by which the voltage command CV is controlled so as to increase in a stepwise manner by a predetermined voltage ($\Delta$CV) in a predetermined cycle ($\Delta t = t22 - t21$).

In accordance with the present embodiment, the determining unit 52 of the CNC apparatus 12 does not perform the process for determining the discharge initiation at the time of the first incremental step (the period from time t2 to t21) immediately after the command voltage CV is switched to the step command. More specifically, at step S4, it is determined whether or not the command voltage CV is at the first incremental step. If it is determined that the command voltage CV is at the first incremental step, the process returns to step S3 to repeat the process for increasing the command voltage CV in a stepwise manner. Accordingly, the process for determining the discharge initiation is not performed at the first incremental step, since the value of the applied voltage V cannot be detected stably immediately after the switching of the command voltage CV, as described above (in FIG. 4, the sample value that cannot be detected stably is indicated by a white square).

If it is determined at step S4 that the command voltage CV is not at the first incremental step, the process proceeds to step S5 where the determining unit 52 is activated to perform the process for determining the discharge initiation. It can be understood that the switching of the command voltage CV does not affect the stable detection of the applied voltage any longer at the second and subsequent incremental steps. As described above, the determination as to whether the discharge is initiated or not can be made by determining whether or not the rate of changes in the applied voltage V with respect to the command voltage CV is smaller than the predetermined threshold value. The threshold value used here can be appropriately determined based on the data obtained from the discharge tube when the electric discharge is normally produced.

If it is determined at step S6 that an electric discharge is initiated, the discharge initiation determining process is terminated. If it is determined that an electric discharge is not yet initiated, the process returns to step S5 to repeat the discharge initiation determining process.

According to the present invention, the ramp command can be switched to the step command without a waiting time. Thus, the idle time before starting the discharge initiation determining process is essentially reduced to a time period corresponding to the first incremental step (the period from time t2 to time t21 in FIG. 4). While the incremental step cycle $\Delta t$ of the step command is determined, depending on the sampling cycle for detecting the applied voltage V (referring to FIG. 4, the sampling time corresponds to the time between adjacent detected values of the applied voltage V), the incremental step cycle $\Delta t$ may be determined so that at least one detected value of the applied voltage V can be obtained at each incremental step. In this way, although the idle time to start the discharge initiation determining process increases or decreases according to the sampling cycle for detecting the voltage of the discharge tube, it is possible to start the discharge initiation determining process sooner than the gas laser oscillator of the related art, in which it is necessary to provide a waiting time exceeding 200 ms.

The discharge initiation determining process has been described above with reference to FIGS. 3 and 4, along with the exemplary case in which the discharge initiation determining process is performed at or after the second incremental step. However, it may also be possible to modify the process so that the discharge initiation determining process is not performed at the first couple of initial incremental steps.

Effect of the Invention

According to the gas laser oscillator having the above configuration, the discharge initiation determining process is performed only after the initial step(s) of the command voltage being increased in a stepwise manner. Accordingly, not only can an erroneous detection associated with the switching of the command voltage be prevented, but also the discharge initiation determining process can be started sooner by eliminating the waiting time before starting the discharge initiation determining process, which has been required in the related art.

While an exemplary embodiment of the present invention has been described above, it will be apparent to a person skilled in the art that the functions and effects intended by the present invention can also be achieved by other embodiments or modified examples. In particular, it is possible to delete or replace some of the constituent elements of the above embodiment or its modified example, or to add known means thereto, without departing from the scope of the invention. It will also be apparent to a person skilled in the art that the invention can be carried out by any combination of the features of a plurality of embodiments either explicitly or implicitly disclosed in this patent specification.

What is claimed is:

1. A gas laser oscillator comprising:
    a control apparatus which creates a command voltage;
    a laser power supply which supplies power to a discharge tube in accordance with the command voltage; and
    a voltage detecting unit which detects a voltage applied to said discharge tube,
    wherein said control apparatus includes a determining unit which determines whether or not an electric discharge is initiated in said discharge tube, based on a rate of changes in the voltage detected by said voltage detecting unit when power is supplied to said discharge tube in accordance with the command voltage being increased in a stepwise manner, and
    wherein said determining unit is configured to determine whether or not an electric discharge is initiated in said discharge tube after an initial step that at least includes the first incremental step of the command voltage being increased in a stepwise manner.

* * * * *